United States Patent
Ishizuka et al.

(10) Patent No.: US 7,245,146 B2
(45) Date of Patent: Jul. 17, 2007

(54) SEMICONDUCTOR DEVICE WITH TERMINATION RESISTANCE ADJUSTING CIRCUIT

(75) Inventors: Yuichi Ishizuka, Kanagawa (JP); Terukazu Ishibashi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 115 days.

(21) Appl. No.: 11/215,039

(22) Filed: Aug. 31, 2005

(65) Prior Publication Data

US 2006/0044009 A1 Mar. 2, 2006

(30) Foreign Application Priority Data

Aug. 31, 2004 (JP) ............... 2004-252803

(51) Int. Cl.
  *H03K 19/003* (2006.01)
(52) U.S. Cl. .......................... 326/30; 326/33
(58) Field of Classification Search ................ 326/30, 326/31, 33, 34
  See application file for complete search history.

(56) References Cited

U.S. PATENT DOCUMENTS

| 6,545,522 | B2 * | 4/2003  | Mughal et al. .......... 327/334 |
| 6,573,746 | B2 * | 6/2003  | Kim et al. .................. 326/30 |
| 6,756,812 | B2   | 6/2004  | Nagano et al. |
| 6,762,620 | B2 * | 7/2004  | Jang et al. ................. 326/30 |
| 6,828,820 | B2   | 12/2004 | Ohno |

FOREIGN PATENT DOCUMENTS

| JP | 2003298395 A | 10/2003 |
| JP | 200432721 A  | 1/2004  |

* cited by examiner

*Primary Examiner*—James H. Cho
(74) *Attorney, Agent, or Firm*—Foley & Lardner LLP (57) ABSTRACT

A semiconductor device includes a transmitter, a termination resistance adjusting section, a transmitter control section and a control signal generating section. The transmitter has two output terminals and operates based on a control current. The termination resistance adjusting section is connected with the output terminals of the transmitter and applies a termination resistance adjusted in response to a control signal to each of the output terminals of the transmitter. The transmitter control section supplies the control current to the transmitter in response the control signal. The control signal generating section compares a first voltage corresponding to an external resistance and a second voltage corresponding to an internal resistance whose precision is lower than that of the external resistance, and outputs the control signal to the termination resistance adjusting section and the transmitter control section based on the comparing result.

20 Claims, 7 Drawing Sheets

SEMICONDUCTOR DEVICE WITH TERMINATION RESISTANCE ADJUSTING CIRCUIT

BACKGROUND OF THE INVENTION

1. Field of the Invention

The present invention relates to a semiconductor device, and more particularly relates to a semiconductor device with a termination resistance adjusting circuit for adjusting a termination resistor.

2. Description of the Related Art

A technique is conventionally known in which a termination resistor is built in a semiconductor device in order to attain cost-down of a transmission system and reduction of a substrate mounting area. When the termination resistor built in the semiconductor device is not adjusted, there may be a high possibility that the resistance of the termination resistor has a wide distribution due to manufacturing variation of the termination resistor. If the resistance of the termination resistor is out of a desired range, signal reflection is caused to deteriorate transmission quality, which results in the decrease in a production yield. Also, the resistance of the termination resistor is a factor to determine an output signal voltage of a transmitting circuit in the transmission system. Therefore, stabilization of both the resistance of the termination resistor and the output signal voltage is required.

Conventional techniques are known in Japanese Laid Open Patent Application (JP-P2003-298395A and JP-P2004-32721A: first and second conventional examples), in which a resistance adjusting circuit is built in a semiconductor device to operate a circuit adequately even if the resistance of a termination resistor is out of a desired range.

Figure 1:
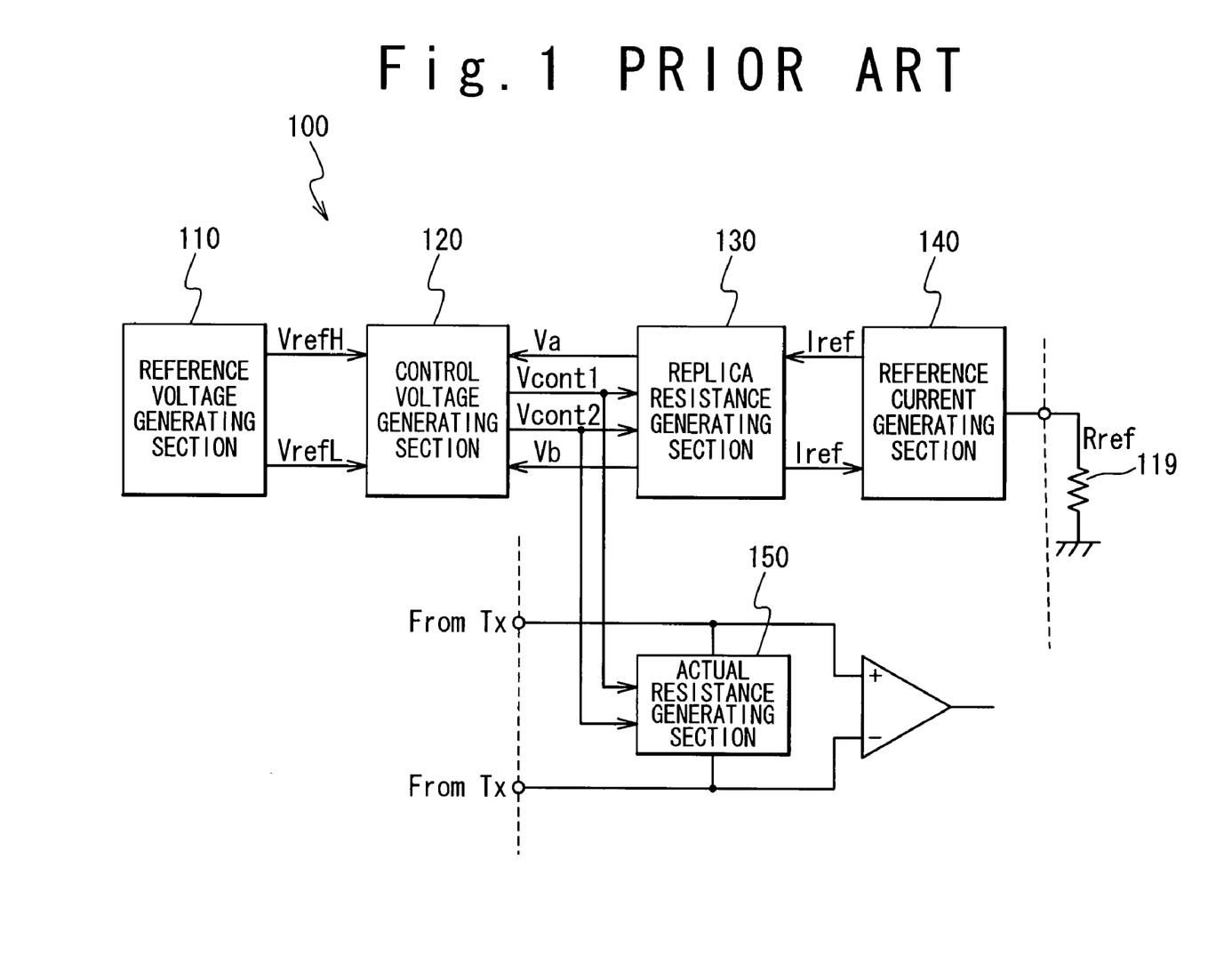
FIG. 1 is a block diagram showing a configuration of a termination resistance adjusting circuit in a first conventional example.

FIG. 1 is a block diagram showing the configuration of a termination resistance adjusting circuit 100 in the first conventional example. In the first conventional example, a stable reference current Iref is generated based on reference voltages VrefH and VrefL and an external resistance 119 and is applied to a replica resistor 130. Voltages Va and Vb generated at that time, and the reference voltages VrefH and VrefL are compared by a control voltage generator 120. Thus, the control voltage generator 120 recognizes the difference between the replica resistor 130 and the external resistance 119 from the comparison result and carries out an adjustment so that the resistance of the replica resistor 130 and that of the external resistance 119 are coincident with each other.

Figure 2:
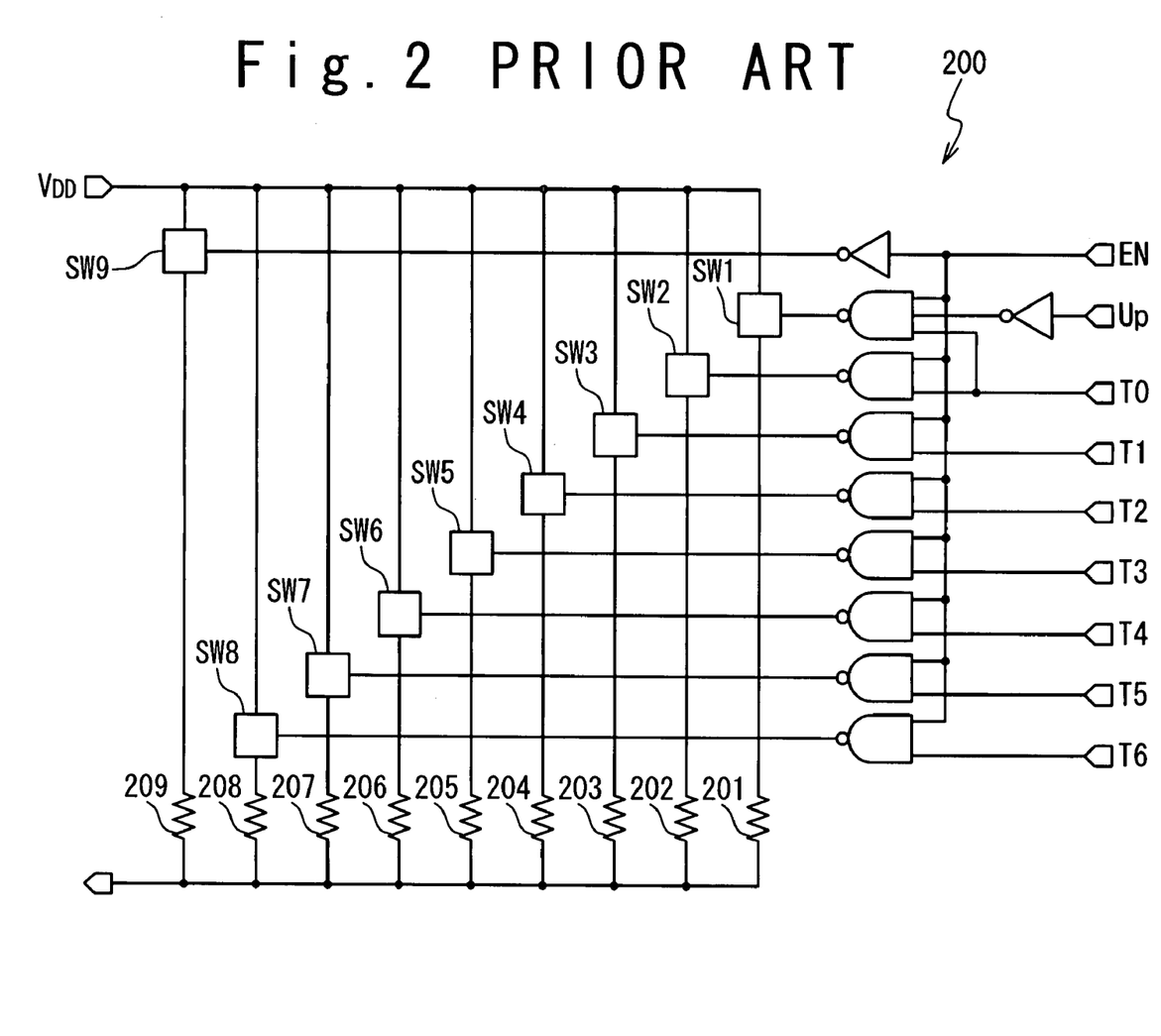
FIG. 2 is a circuit diagram showing a configuration of an impedance variable circuit in a second conventional example.

Also, FIG. 2 is a block diagram showing the configuration of an impedance variable circuit 200 in the second conventional example. In the impedance variable circuit shown in FIG. 2, a synthetic resistance of resistors (201 to 209) is varied by controlling switches (SW1 to SW9) and is used as a termination resistor.

Figure 3:
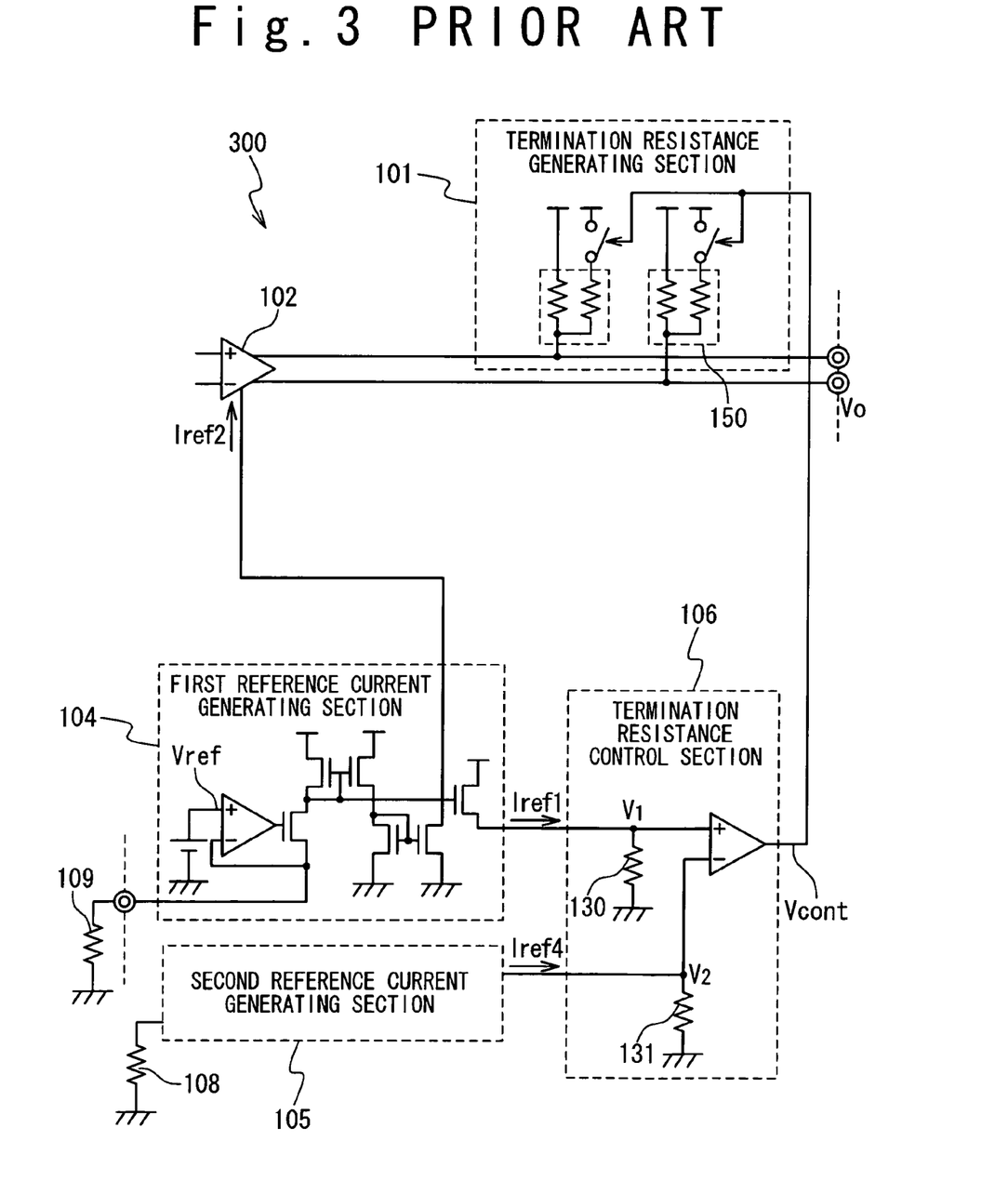
FIG. 3 is a circuit diagram showing a configuration of the termination resistance adjusting circuit when the second conventional example is applied to the first conventional example.

FIG. 3 is a circuit diagram showing a specific circuit configuration of a termination resistance adjusting circuit 300, which is constituted from the above-mentioned termination resistance adjusting circuit 100 and the impedance variable circuit 200. As shown in FIG. 3, the termination resistance adjusting circuit 300 is composed of a termination resistor generator 101, a transmitting circuit 102, a first reference current generator 104, a second reference current generator 105 and a termination resistance controller 106. In the termination resistance adjusting circuit 300, the first reference current generator 104 generates a stable reference current Iref1 based on a reference voltage Vref and an external resistance 109, and applies the reference current Iref1 to a replica resistor 130 of the termination resistance controller 106. Also, the second reference current generator 105 generates a stable reference current Iref4 based on a reference voltage Vref and an internal resistance 108, and applies the reference current Iref4 to a replica resistor 131 of the termination resistance controller 106. The termination resistance controller 106 compares a voltage V1 generated based on the current Iref1 and the resistor 130 and a voltage V2 generated based on the current Iref4 and the resistor 131, and recognizes the difference between the internal resistance 108 and the external resistance 109 from the comparing result. Then, the termination resistance controller 106 outputs a control signal Vcont to the termination resistor generator 101 based on the comparing result. The termination resistor generator 101 generates a resistance through separation and synthesis of resistors in response to the control signal Vcont, such that a precision of the internal resistance is coincident with that of the external resistance.

When the termination resistor is assumed to be a resistor value R150 and the reference current is assumed to be a reference current Iref2, a transmitting circuit output voltage Vo is represented by:

$$Vo = R150 * Iref2 \quad (1)$$

In the conventional termination resistance adjusting circuit 300 shown in FIG. 3, the voltages V1 and V2 are compared. The voltage V2 is generated when the current Iref4 is applied to the resistor 131. The current Iref4 is generated based on a reference voltage Vref and the internal resistance 108. The reference voltage Vref is supplied from a band gap power supply circuit or the like, in which an output voltage variation caused due to external factors such as a temperature variation, a power source voltage variation and the like is small.

The voltage V1 is generated when the current Iref1 is applied to the resistor 130. The current Iref1 is generated based on the reference voltage Vref and the external resistance 109 which is more stable than the internal resistance in an absolute precision. The reference voltage Vref is supplied from the above-mentioned band gap power supply circuit or the like.

Here, when the internal resistances 108 and 131 are assumed to be R108 and R131, respectively, and the external resistance 109 and the internal resistance 130 are similarly assumed to be R109 and R130, respectively, the voltages V1 and V2 are represented by the following equations.

$$V2 = (Vref/R108) * R131 \quad (2)$$

$$V1 = (Vref/R109) * R130 \quad (3)$$

In this case, since the internal resistances 131 and 108 have the same structure, the relative precision is insured. Therefore, the item of "R131/R108" in the above equation (2) has a constant value. Thus, the voltage V2 is the stable voltage similar to the reference voltage Vref.

Figure 4:
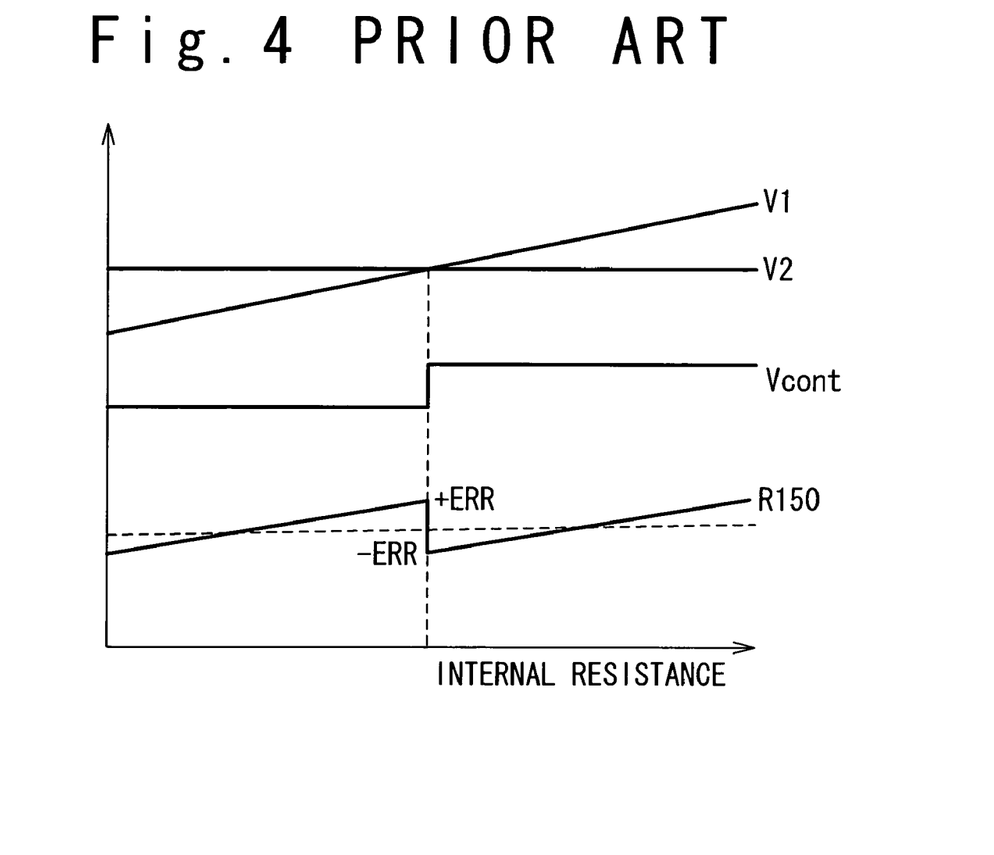
FIG. 4 is a waveform diagram showing an operation of the conventional termination resistance adjusting circuit shown in FIG. 3.

Also, since the external resistance 109 has an extremely high precision as compared with the internal resistance, the item of "Vref/R109" in the above equation (3) can be regarded as a constant value. Thus, the voltage V1 is a value proportional to the internal resistance 130. FIG. 4 shows the above relation. When the voltages V1 and V2 are compared, if the voltage V1 is determined to be excessively higher than the voltage V2 (namely, the internal resistance is excessively high), the control signal Vcont is outputted to adjust the resistance R150 to a low value. Consequently, the precision of the termination resistor 150 after the adjustment is similar to that of the external resistance 109.

However, the actual adjustment is carried out in a step manner of a definite range. Thus, even in the ideally adjusted state, the resistances before and after the adjustment are discontinuous, which brings about an error depending on the adjustment resolution of the termination resistor 150. In particular, it could be understood that the maximum error (ERR) is generated in the vicinity of the adjustment.

Under the assumption that the termination resistor has been adjusted, a fixed current Iref2 is generated based on the stable power voltage Vref and the external resistance 109 and applied to the transmitting circuit 102. Thus, the transmitting circuit output voltage Vo is a function of the termination resistor 150, as represented by the following equation (4).

$$Vo = Iref2 * R150 \quad (4)$$

Figure 5:
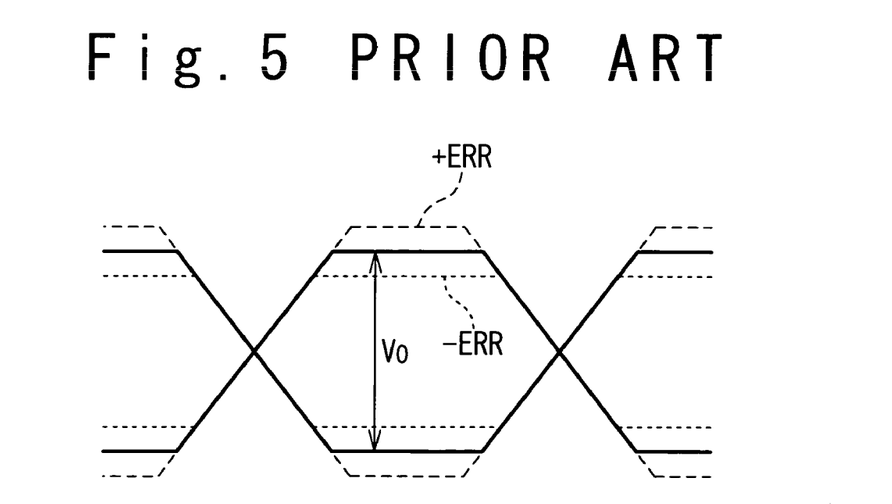
FIG. 5 is a diagram showing the waveform of an output signal from a transmitting circuit in the conventional termination resistance adjusting circuit shown in FIG. 3.

FIG. 5 is a diagram showing the waveform of an output signal outputted from the termination resistance adjusting circuit 300. With reference to the waveform shown in FIG. 5, the voltage error +ERR, −ERR remains in the output signal waveform due to the adjustment error of the termination resistor 150. The voltage error +ERR, −ERR sometimes causes poor measurement reproducibility or a large deviation of the output voltage of the transmitting circuit 102.

In order to avoid these problems, a method is known in which the adjustment resolution is made higher. However, if such a method is employed, the higher precision of the termination resistance controller 106 is required, which leads to a larger circuit scale. Also, since the number of switching circuits in the termination resistor generator 101 is increased, a capacitive load becomes greater, which restricts a frequency band.

The termination resistance adjusting circuit is desired in which the adjustment error to the termination resistor has no influence on the output voltage, without the increase in the circuit scale and the limitation on the frequency band.

SUMMARY OF THE INVENTION

In an aspect of the present invention, a semiconductor device includes a transmitter, a termination resistance adjusting section, a transmitter control section and a control signal generating section. The transmitter has two output terminals and operates based on a control current. The termination resistance adjusting section is connected with the output terminals of the transmitter and applies a termination resistance adjusted in response to a control signal to each of the output terminals of the transmitter. The transmitter control section supplies the control current to the transmitter in response the control signal. The control signal generating section compares a first voltage corresponding to an external resistance and a second voltage corresponding to an internal resistance whose precision is lower than that of the external resistance, and outputs the control signal to the termination resistance adjusting section and the transmitter control section based on the comparing result.

Here, the control signal generating section may include a first reference current generating section which generates a first reference current corresponding to the external resistance, a second reference current generating section which generates a second reference current corresponding to the internal resistance, and a termination resistor control section. The termination resistor control section generates the first voltage and the second voltage based on the first reference current and the second reference current, respectively, and supplies the control signal to the termination resistance adjusting section and the transmitter control section by comparing the first and second voltages.

Also, the transmitter control section may include a reference resistance adjusting section configured to apply a reference resistance corresponding to the termination resistor in response to the control signal, and a control current generating section configured to generate and supply the control current corresponding to the reference resistance to the transmitter.

In this case, the reference resistance adjusting section may include a reference basic resistor, a reference adjustment resistor, and a reference switch circuit configured to connect the reference adjustment resistor with the reference basic resistor in parallel in response to the control signal. Also, the control current generating section may include an amplifier having a positive input connected with a first reference voltage, a first transistor having a gate connected with an output of the amplifier, and a source connected with the reference resistance adjusting section and a negative input of the amplifier, and a current mirror circuit connected with a drain of the first transistor, and to supply the control current as an output current to the transmitter.

Also, the termination resistance adjusting section may include a basic resistor provided for each of the output terminals of the transmitter, a adjustment resistor provided for each of the output terminals of the transmitter, and a switch circuit configured to connect the adjustment resistor with the basic resistor in parallel in response to the control signal.

Also, it is preferable that a ratio of a resistance of the reference basic resistor and a resistance of the reference adjustment resistor is equal to a ratio of a resistance of the basic resistor and a resistance of the adjustment resistor.

Also, the transmitter may include a differential transistor pair configured to drive the output terminals of the transmitter, and a constant current source connected with the differential transistor pair, and configured to supply the differential transistor pair with a constant current determined based on the control current. Instead, the transmitter may include a differential transistor pair configured to drive the output terminals of the transmitter. The control current is supplied as a constant current for the differential transistor pair.

In another aspect of the present invention, a method of adjusting a transmitter in a semiconductor device is achieved by generating a control signal based on an external resistance and an internal resistance built in the semiconductor device, wherein a precision of the external resistance higher than that of the internal resistance; by adjusting load resistances of differential transistor pair as termination resistors in response to the control signal; and by adjusting a constant current for the differential transistor pair in response to the control signal.

The generating a control signal may be achieved by generating a first reference current corresponding to the external resistance; by generating a second reference current corresponding to the internal resistance; by generating a first voltage and a second voltage based on the first reference current and the second reference current, respectively; and by comparing the first and second voltages to generate the control signal.

Also, the adjusting load resistances of differential transistor pair may be achieved by connecting an adjustment resistor with a basic resistor in parallel in response to the control signal.

Also, the adjusting a constant current may be achieved by adjusting a reference resistance corresponding to the termination resistors in response to the control signal; and by supplying the control current corresponding to the reference resistance to the differential transistor pair.

In this case, the adjusting a reference resistance may be achieved by connecting a reference adjustment resistor with a reference basic resistor in parallel in response to the control signal to generate the reference resistance.

Also, the supplying the control current may be achieved by controlling a current flowing through the reference resistance based on a reference voltage; and by supplying as the control current a current corresponding to the current flowing through the reference resistance to the differential transistor pair by a mirror circuit.

Also, a ratio of a resistance of the reference basic resistor and a resistance of the reference adjustment resistor is equal to a ratio of a resistance of the basic resistor and a resistance of the adjustment resistor.

In another aspect of the present invention, a semiconductor device includes a transmitter having a differential transistor pair, a control section configured to generate a control signal based on an external resistance and an internal resistance built in the semiconductor device, wherein a precision of the external resistance higher than that of the internal resistance; a termination resistance adjusting section configured to adjust load resistances of the differential transistor pair as termination resistors in response to the control signal; and a transmitter control section configured to control a constant current for the differential transistor pair in response to the control signal.

Here, the transmitter control section may include a reference resistance adjusting section configured to adjust a reference resistance corresponding to the termination resistors in response to the control signal; and a supplying section configured to supply the control current corresponding to the reference resistance to the differential transistor pair.

DESCRIPTION OF THE PREFERRED EMBODIMENTS

Hereinafter, a semiconductor device with a termination resistance adjusting circuit of the present invention will be described in detail with reference to the attached drawings.

Figure 6:
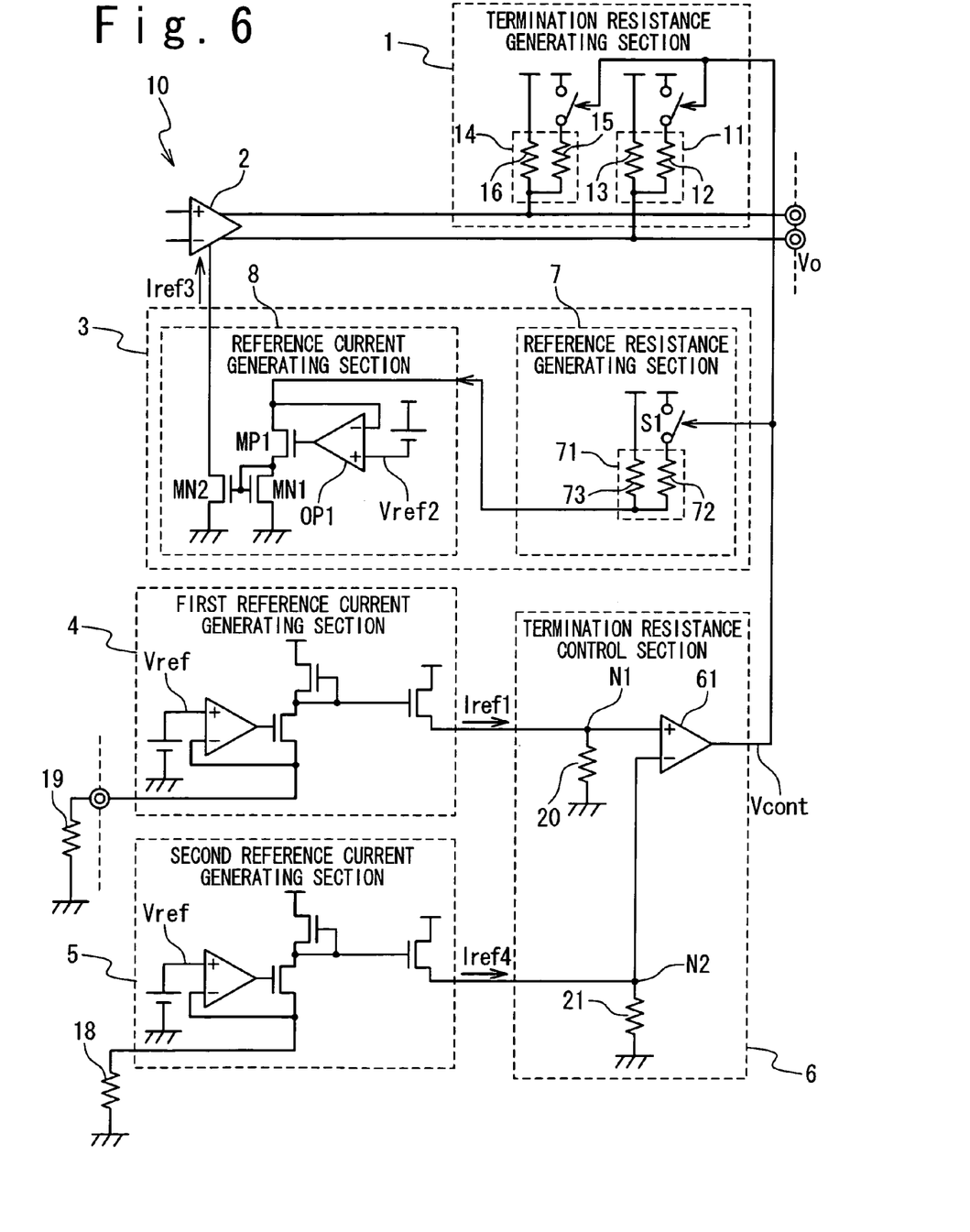
FIG. 6 is a circuit diagram showing a configuration of a termination resistance adjusting circuit in an embodiment of the present invention.

FIG. 6 is a circuit diagram showing the configuration of the termination resistance adjusting circuit 10 in the embodiment of the present invention. As shown in FIG. 6, the termination resistance adjusting circuit 10 is provided with a termination resistor generator 1, a reference current corrector 3, a first reference current generator 4, a second reference current generator 5 and a termination resistance controller 6. The reference current corrector 3 includes a reference resistance generator 7 and a reference current generator 8.

The first reference current generator 4 generates a reference current Iref1 based on a reference voltage Vref and an external reference resistor 19. The first reference current generator 4 supplies the generated reference current Iref1 to the termination resistance controller 6. Similarly, the second reference current generator 5 generates a current Iref4 based on the reference voltage Vref and an internal reference resistor 18. The second reference current generator 5 supplies the generated reference current Iref4 to the termination resistance controller 6, as well as to the first reference current generator 4. The termination resistance controller 6 applies the reference current Iref1 to an internal resistance 20. Consequently, a voltage of a node N1 becomes a voltage V1, and the voltage V1 is applied to a control signal generating circuit 61. Similarly, the termination resistance controller 6 applies the reference current Iref4 to an internal resistance 21. Consequently, a voltage of a node N2 becomes a voltage V2, and the voltage V2 is applied to the control signal generating circuit 61. The control signal generating circuit 61 compares the voltages V1 and V2. The termination resistance controller 6 outputs the comparison result as a control signal Vcont to the termination resistor generator 1 and the reference current corrector 3. The termination resistor generator 1 receives the control signal Vcont and adjusts a termination resistor 11 and a termination resistor 14. In the following explanation, since the configuration and operation of the termination resistor 14 are similar to those of the termination resistor 11, the termination resistor 11 is mainly explained.

The reference resistance generator 7 receives the control signal Vcont from the termination resistance controller 6, adjusts the resistance of a reference resistor 71 to a resistance R51. The reference current generator 8 generates a reference current Iref3, which is obtained by applying a reference voltage Vref2 to the adjusted resistor value R51, and supplies the reference current Iref3 to the transmitting circuit 2. The reference resistance generator 7 includes a reference resistor 71, and the reference resistor 71 is composed of a basic resistor 73 and an adjustment resistor 72 to be connected in parallel to the basic resistor 73. As shown in FIG. 6, the adjustment resistor 72 is connected to a switch circuit S1. The switch circuit S1 is operated in response to the control signal Vcont outputted from the termination resistance controller 6. Preferably, the switch circuit S1, basic resistor 73 and adjustment resistor 72, which constitute the reference resistance generator 7, have the same structures as those constituting the termination resistor generator 1, so as to be matched with the termination resistor generator 1.

The reference current generator 8 includes an operational amplifier OP1, a transistor MP1, a transistor MN1 and a transistor MN2. As shown in FIG. 6, a gate of the transistor MP1 is connected to an output end of the operational amplifier OP1. A source of the transistor MP1 is connected to the reference resistance generator 7. Also, the source of the transistor MP1 is connected to a negative feedback input terminal of the operational amplifier OP1. The transistor MN1 and the transistor MN2 constitute a current mirror circuit. A drain of the transistor MP1 is connected to the gate and drain of the transistor MN1. In the reference current generator 8, the output of this current mirror acts as an output terminal.

Figure 7:
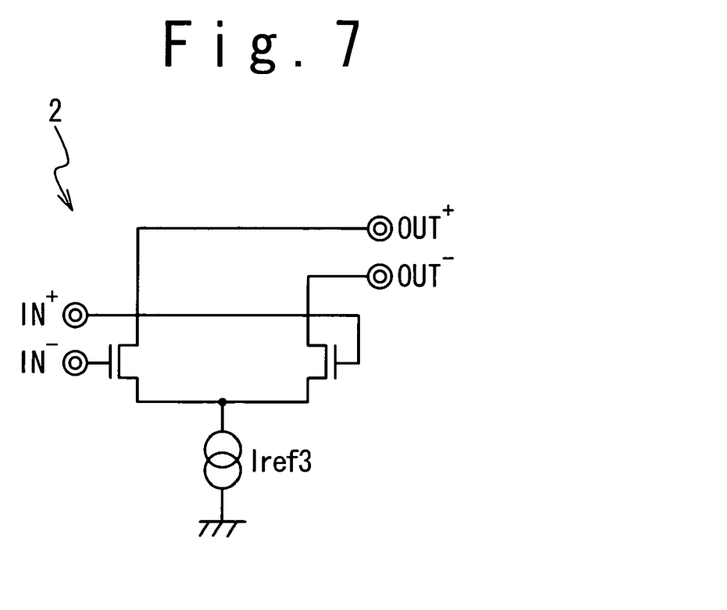
FIG. 7 is a circuit diagram showing a configuration of a transmitting circuit in the embodiment of the present invention.
Figure 9:
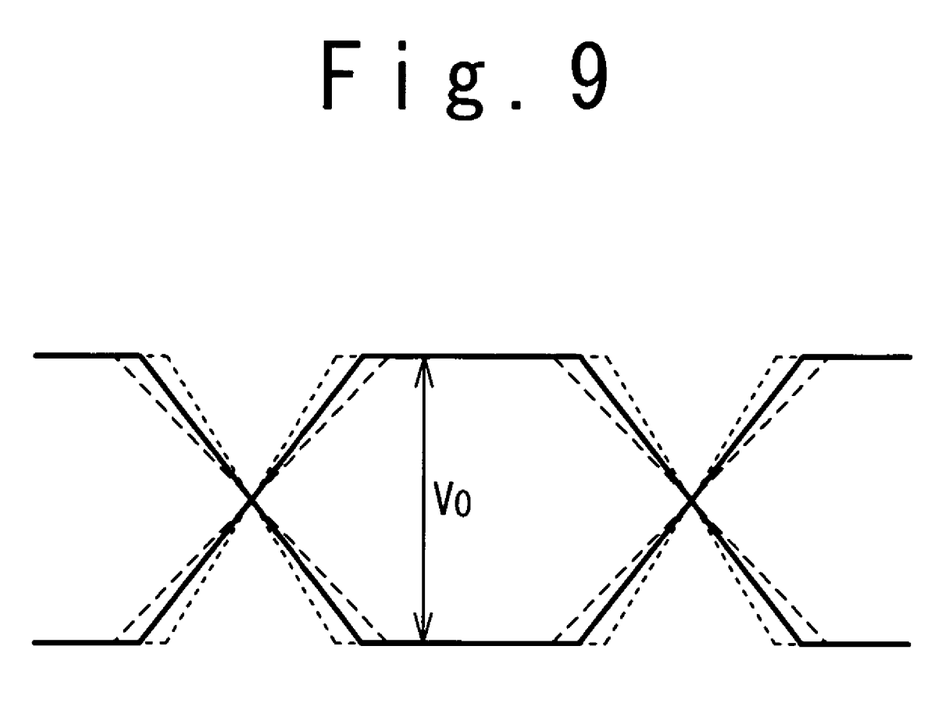
FIG. 9 is a diagram showing the waveform of an output signal from the transmitting circuit in the termination resistance adjusting circuit according to the embodiment of the present invention.

FIG. 7 is a circuit diagram showing the configuration of the transmitting circuit 2 in the embodiment of the present invention. As shown in FIG. 7, the transmitting circuit 2 is composed of a differential transistor pair. The adjusted termination resistors 14 and 11 function as load resistances of the differential transistor pair. In this embodiment, a constant current for the differential transistor pair is supplied as the reference current Iref3 from the current mirror circuit of the reference current generator 8. Although not showing, a constant current source may be separately provided and may supply a constant current to the differential transistor pair based on the reference current Iref3. When the resistance of the termination resistor 11 is assumed to be a resistance R50 and the reference current Iref3 is used, a transmission output level Vo of the transmitting circuit 2 is represented by:

$$Vo = R50 * Iref3$$

from FIG. 9.

The first reference current generator 4 has a stabilized band gap power supply or the like, and generates the reference current Iref1 by applying a voltage Vref from the stabilized power supply to the external internal resistance R19. Also, the second reference current generator 5 has a stabilized band gap power supply similar to that of the first reference current generator 4, and generates the reference current Iref4 by applying the voltage Vref from the stabilized band gap power supply to the internal resistance 18 which is expected to have the same value as the external resistance R19. Thus, the reference current Iref1 and the reference current Iref4 can be represented by the following equations:

$$Iref1 = Vref/R19$$

$$Iref4 = Vref/R18$$

The generated reference current Iref1 is applied to the internal resistance 20, and the reference current Iref4 is applied to the internal resistance 21. The termination resistance controller 6 compares the voltage V1 generated by the internal resistance 20 and the voltage V2 generated by the internal resistance 21. The voltages V1 and V2 can be represented by the following equations:

$$V1 = Iref1 * R20 = Vref/R19 * R20 \quad (5)$$

$$V2 = Iref4 * R21 = Vref/R18 * R21 \quad (6)$$

The termination resistor generator 1 receives the control signal Vcont outputted from the termination resistance controller 6 and drives the switch circuit. Since the switch circuit is turned on, the basic resistor 13 and an adjustment resistor 12 are connected in parallel. When the resistance of the adjustment resistor 12 is assumed to be a resistance R12 and when the resistance of the basic resistor 13 is assumed to be a resistance R13, its synthesized resistance R50 is changed as follows:

$$R50 = R13 * R12/(R13 + R12) \quad (7)$$

Here, the reference resistance generator 7 similarly receives the control signal Vcont outputted from the termination resistance controller 6 and drives the switch circuit. Since the switch circuit is turned on, the basic resistor 73 and the adjustment resistor 72 are connected in parallel. When the resistance of the basic resistor 73 is assumed to be a resistor value R73 and when the resistance of the adjustment resistor 72 is assumed to be a resistor value R72, its synthesized resistor value R51 is changed as follows:

$$R51 = R73 * R72/(R73 + R72) \quad (8)$$

Figure 8:
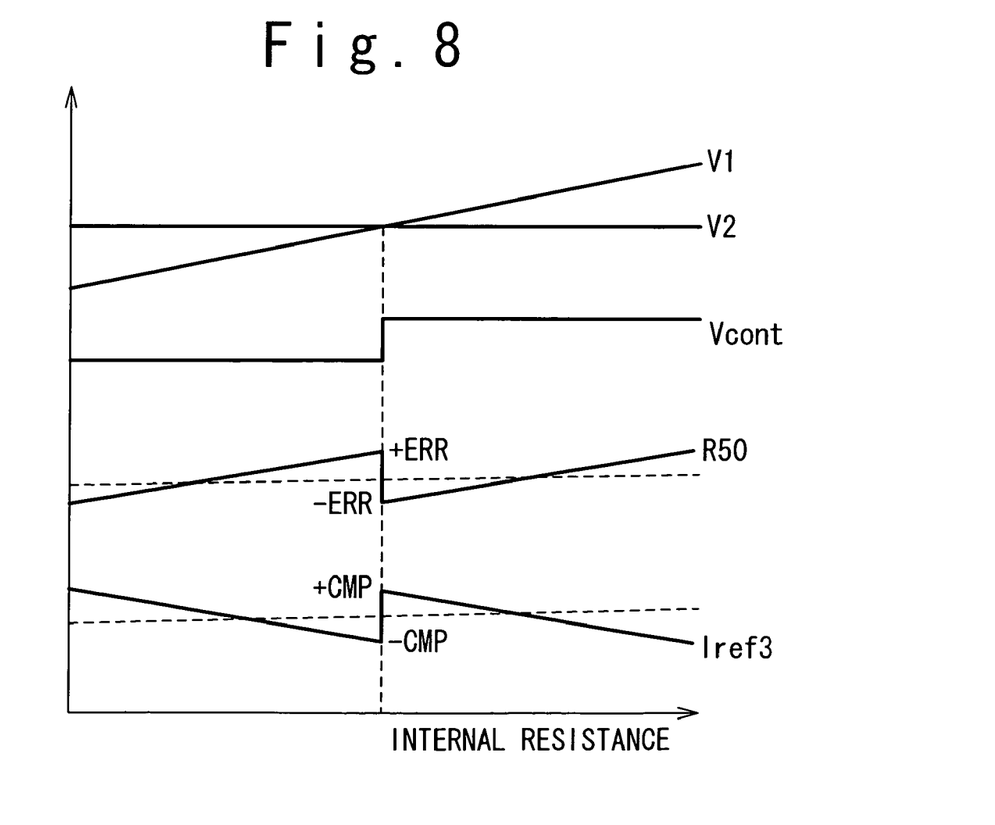
FIG. 8 is a diagram showing signal waveforms in an operation of the termination resistance adjusting circuit according to the embodiment of the present invention.

The reference current generator 8 applies the reference voltage Vref2 to the reference resistor value R51 provided by the reference resistance generator 7 and generates the reference current Iref3. The reference current generator 8 supplies the current Iref3 to the transmitting circuit. If the reference resistor value R51 is adjusted, the reference current Iref3 is also corrected at the same time. FIG. 8 is a diagram showing an operational of the termination resistance adjusting circuit 10 in this embodiment. As shown in FIG. 8, the operation waveform of the reference current Iref3 has a relation between the reference resistor R51 and the termination resistor R50, and it can be represented by the following equation:

$$Iref3 = Vref2/R51$$

For this reason, the output signal voltage Vo of the transmitting circuit 2 is represented by a product of the reference current Iref3 and the resistance R50 of the termination resistor 11, and it is represented by the following equation:

$$Vo = Iref3 * R50 = Vref2 * R50/R51 \quad (9)$$

At this time, the termination resistor generator 1 and the reference resistance generator 7 are adjusted at the same time. As a result, the ratio between the resistance R12 of the adjustment resistor 12 and the resistance R13 of the basic resistor 13, and the resistance R73 of the basic resistor 73 and the resistance R72 of the adjustment resistor 72 is set as follows:

$$R13:R12 = R73:R72$$

Since the respective resistances are set as mentioned above, the following relation is always established between the synthesized resistance R50 expressed by the equation (7) and the synthesized resistance R51 expressed by the equation (8):

$$R50 \propto R51$$

At this time, the item of "R50/R51" in the equation (9) becomes a constant value in the meaning. Thus, the output voltage can be represented as a function that does not contain a term depending on a resistance, as follows:

$$Vo \propto Vref2$$

FIG. 9 is a diagram showing the output waveform of the transmitting circuit when the termination resistance adjusting circuit in the embodiment of the present invention is employed. With reference to FIG. 9, the output signal voltage Vo is outputted as a constant value. This implies that the constant output signal voltage Vo is obtained irrespectively of the controlled state of the internal resistance R51.

As described above, according to the present invention, it is possible to design the termination resistance adjusting circuit in which the adjustment error due to the resistance of the termination resistor has no influence on the output voltage.

What is claimed is:

1. A semiconductor device comprising:
a transmitter having two output terminals and configured to operate based on a control current;
a termination resistance adjusting section connected with said output terminals of said transmitter and configured to apply a termination resistance adjusted in response to a control signal to each of said output terminals of said transmitter;
a transmitter control section configured to supply said control current to said transmitter in response said control signal; and
a control signal generating section configured to compare a first voltage corresponding to an external resistance and a second voltage corresponding to an internal resistance whose precision is lower than that of said external resistance, and to output said control signal to said termination resistance adjusting section and said transmitter control section based on said comparing result.

2. The semiconductor device according to claim 1, wherein said control signal generating section comprises:
a first reference current generating section configured to generate a first reference current corresponding to said external resistance;
a second reference current generating section configured to generate a second reference current corresponding to said internal resistance; and
a termination resistance control section configured to generate said first voltage and said second voltage based on said first reference current and said second reference current, respectively, and to supply said control signal to said termination resistance adjusting section and said transmitter control section by comparing said first and second voltages.

3. The semiconductor device according to claim 1, wherein said transmitter control section comprises:
a reference resistance adjusting section configured to apply a reference resistance corresponding to said termination resistance in response to said control signal; and
a control current generating section configured to generate and supply said control current corresponding to said reference resistance to said transmitter.

4. The semiconductor device according to claim 3, wherein said reference resistance adjusting section comprises:
a reference basic resistor;
a reference adjustment resistor; and
a reference switch circuit configured to connect said reference adjustment resistor with said reference basic resistor in parallel in response to said control signal.

5. The semiconductor device according to claim 4, wherein said termination resistance adjusting section comprises:
a basic resistor provided for each of said output terminals of said transmitter;
a adjustment resistor provided for each of said output terminals of said transmitter; and
a switch circuit configured to connect said adjustment resistor with said basic resistor in parallel in response to said control signal.

6. The semiconductor device according to claim 5, wherein a ratio of a resistance of said reference basic resistor and a resistance of said reference adjustment resistor is equal to a ratio of a resistance of said basic resistor and a resistance of said adjustment resistor.

7. The semiconductor device according to claim 3, wherein said control current generating section comprises:
an amplifier having a positive input connected with a first reference voltage;
a first transistor having a gate connected with an output of said amplifier, and a source connected with said reference resistance adjusting section and a negative input of said amplifier; and
a current mirror circuit connected with a drain of said first transistor, and to supply said control current as an output current to said transmitter.

8. The semiconductor device according to claim 1, wherein said termination resistance adjusting section comprises:
a basic resistor provided for each of said output terminals of said transmitter;
a adjustment resistor provided for each of said output terminals of said transmitter; and
a switch circuit configured to connect said adjustment resistor with said basic resistor in parallel in response to said control signal.

9. The semiconductor device according to claim 1, wherein said transmitter comprises:
a differential transistor pair configured to drive said output terminals of said transmitter; and
a constant current source connected with said differential transistor pair, and configured to supply said differential transistor pair with a constant current determined based on said control current.

10. The semiconductor device according to claim 1, wherein said transmitter comprises:
a differential transistor pair configured to drive said output terminals of said transmitter, and
said control current is supplied as a constant current for said differential transistor pair.

11. A method of adjusting a transmitter in a semiconductor device, comprising:
generating a control signal based on an external resistance and an internal resistance built in said semiconductor device, wherein a precision of said external resistance higher than that of said internal resistance;
adjusting load resistances of differential transistor pair as termination resistances in response to said control signal; and
adjusting a constant current for said differential transistor pair in response to said control signal.

12. The method according to claim 11, wherein said generating a control signal comprises:
generating a first reference current corresponding to said external resistance;
generating a second reference current corresponding to said internal resistance;
generating a first voltage and a second voltage based on said first reference current and said second reference current, respectively; and
comparing said first and second voltages to generate said control signal.

13. The method according to claim 11, wherein said adjusting load resistances of differential transistor pair comprises:
connecting an adjustment resistor with a basic resistor in parallel in response to said control signal.

14. The method according to claim 13, wherein said adjusting a constant current comprises:
adjusting a reference resistance corresponding to said termination resistances in response to said control signal; and supplying said control current corresponding to said reference resistance to said differential transistor pair, and said adjusting a reference resistance comprises:

connecting a reference adjustment resistor with a reference basic resistor in parallel in response to said control signal to generate said reference resistance.

15. The method according to claim 14, wherein a ratio of a resistance of said reference basic resistor and a resistance of said reference adjustment resistor is equal to a ratio of a resistance of said basic resistor and a resistance of said adjustment resistor.

16. The method according to claim 11, wherein said adjusting a constant current comprises:

adjusting a reference resistance corresponding to said termination resistances in response to said control signal; and supplying said control current corresponding to said reference resistance to said differential transistor pair.

17. The method according to claim 16, wherein said adjusting a reference resistance comprises:

connecting a reference adjustment resistor with a reference basic resistor in parallel in response to said control signal to generate said reference resistance.

18. The method according to claim 16, wherein said supplying said control current comprises:

controlling a current flowing through said reference resistance based on a reference voltage; and supplying as said control current a current corresponding to said current flowing through said reference resistance to said differential transistor pair by a mirror circuit.

19. A semiconductor device comprising:

a transmitter having a differential transistor pair;

a control section configured to generate a control signal based on an external resistance and an internal resistance built in said semiconductor device, wherein a precision of said external resistance higher than that of said internal resistance;

a termination resistance adjusting section configured to adjust load resistances of said differential transistor pair as termination resistances in response to said control signal; and a transmitter control section configured to control a constant current for said differential transistor pair in response to said control signal.

20. The semiconductor device according to claim 19, wherein said transmitter control section comprises:

a reference resistance adjusting section configured to adjust a reference resistance corresponding to said termination resistances in response to said control signal; and a supplying section configured to supply said control current corresponding to said reference resistance to said differential transistor pair.

* * * * *